US009770010B2

(12) United States Patent
Wechsler

(10) Patent No.: US 9,770,010 B2
(45) Date of Patent: Sep. 26, 2017

(54) MULTI-FUNCTION PET TOY

(76) Inventor: Lawrence I. Wechsler, Great Neck, NY (US)

( * ) Notice: Subject to any disclaimer, the term of this patent is extended or adjusted under 35 U.S.C. 154(b) by 0 days.

(21) Appl. No.: 13/551,620

(22) Filed: Jul. 18, 2012

(65) Prior Publication Data

US 2013/0074780 A1 Mar. 28, 2013

Related U.S. Application Data

(60) Provisional application No. 61/509,064, filed on Jul. 18, 2011, provisional application No. 61/599,936, filed on Feb. 17, 2012.

(51) Int. Cl.
*A01K 15/02* (2006.01)

(52) U.S. Cl.
CPC .......... *A01K 15/025* (2013.01); *A01K 15/026* (2013.01)

(58) Field of Classification Search
CPC ..... A01K 15/025; A01K 15/026; A01K 15/02
USPC ................. 119/707, 709, 710, 711, 702, 708
See application file for complete search history.

(56) References Cited

U.S. PATENT DOCUMENTS

| | | | | |
|---|---|---|---|---|
| 6,148,771 A * | 11/2000 | Costello | ........................ | 119/709 |
| D511,029 S * | 10/2005 | Willinger | ..................... | D30/160 |
| 7,017,523 B2 * | 3/2006 | Handelsman | ................. | 119/707 |
| 7,234,420 B1 * | 6/2007 | Tsengas | ........................ | 119/710 |
| 8,113,150 B1 * | 2/2012 | Tsengas | ........................ | 119/711 |
| 2005/0045115 A1 * | 3/2005 | Mann | ............................ | 119/711 |
| 2005/0166865 A1 * | 8/2005 | Handelsman et al. | ........ | 119/709 |
| 2007/0068464 A1 * | 3/2007 | Smith et al. | .................. | 119/709 |
| 2007/0277747 A1 * | 12/2007 | Gick | ............................. | 119/707 |
| 2009/0038559 A1 * | 2/2009 | Markham | ...................... | 119/707 |
| 2009/0038560 A1 * | 2/2009 | Markham | ...................... | 119/709 |
| 2012/0204809 A1 * | 8/2012 | Axelrod et al. | .............. | 119/709 |

* cited by examiner

*Primary Examiner* — Trinh Nguyen

(57) ABSTRACT

A pet toy can be used as a fetch toy, chew toy and/or a treat dispenser, and/or also optionally as a dental aid. The toy includes a body having a central toy axis which extends between opposed poles of the body, the body further including at least three circumferentially spaced-apart ribs which extend between the poles to define an outer envelope of the pet toy. The material comprising the body is advantageously an elastomer, including natural or synthetic rubber, or a suitable plastic having elastomeric properties.

17 Claims, 7 Drawing Sheets

MULTI-FUNCTION PET TOY

CROSS REFERENCE TO RELATED APPLICATIONS

This application claims the benefit of U.S. Provisional Application No. 61/509,064 filed Jul. 18, 2011 entitled MULTI-FUNCTION PET TOY and U.S. Provisional Application No. 61/599,936 filed Feb. 17, 2012 entitled MULTI-FUNCTION PET TOY.

BACKGROUND OF THE INVENTION

The present invention relates to a pet toy, and more particularly to a pet toy providing various functions and benefits during play.

Chew toys are known, and are generally made of natural rubber or synthetic elastomers. They are available in various shapes designed to provide chewing exercise to a dog. Efforts are ordinarily made, in the design of a toy intended for chewing, to inhibit destruction of the toy by appropriate selection of size, shape and/or material.

Fetch toys are also a well known product in the pet trade. Many improvements have been suggested, including providing ball launchers that limit exposure of the dog owner to pet saliva during fetch play. These are commonly designed to be used to propel a standard-sized tennis ball, and are quite effective not only in limiting contact with saliva by allowing pickup of the ball by a distal portion of the launching device, but also in increasing a throwing distance. However, tennis balls have been known to contain substances, for example, in the glue used to attach the felt covering to the rubber interior structure, which can be toxic to dogs.

Other pet toys, which provide a treat dispensing function, are also known in the art, and generally include a chewable body having an interior hollow cavity accessible through a restricted opening via which treats can be introduced into the cavity. The stored treats are then randomly released from the toy through the same opening based upon movement or in response to chewing activity which forcibly releases the treats or pieces thereof. However, many of these toys have specific manufacturing requirements which limit production materials. For example, where a toy has a hollow interior chamber larger than the restricted treat introduction/treat release opening, an injection molding process cannot be readily used since it is not generally feasible to remove an oversized mold core used to create the interior hollow chamber through the much smaller opening. Consequently, manufacture of these toys is generally limited to natural rubber fabricating techniques (vulcanization while in a mold), since such processes permit a larger core to be withdrawn while the rubber is still soft and not fully vulcanized.

Like chew toys, efforts are normally taken to delay destruction of the treat release toys caused by chewing during the process of freeing the treats, by selective formulation of rubber. While there are certain thermoplastic synthetic elastomers available or which are custom engineered, and that are already used for some of the more durable chew toys presently available, which are much more resilient and tear-resistant than even the best natural rubber, processing of these engineered materials into a product requires the use of injection molding processes. Therefore, the use of these engineered elastomers does not present a viable option for producing a hollow treat releasing toy with resistance against destruction which is superior to that of natural rubber.

Furthermore, in accordance with conventional treat releasing toys, a number of treats are generally loosely held within a chamber, and therefore, there is a low degree of challenge for the pet to obtain a treat held within the toy. Various dental toys are also known which are designed to aid in removal of plaque from a pet's teeth during chewing of the toy. For example, toys including rope are thought to be helpful in cleaning the teeth of a pet, much in the manner of a human using floss.

A further drawback of the aforementioned toys resides in the fact that each type is directed to a dedicated one of the functions described.

SUMMARY OF THE INVENTION

It is an object of the invention to provide a toy which optionally provides a multitude of functions, and which advantageously lends itself to production, if optionally desired, by injection molding, as well as by conventional rubber forming techniques.

In accordance with these and other objects of the invention, there is provided a pet toy which can advantageously be used as a fetch toy, chew toy and/or a treat dispenser, and/or also optionally as a dental aid. The toy includes a body having a central toy axis which extends between opposed poles of the body, the body further including at least three circumferentially spaced-apart ribs which extend between the poles to define an outer envelope of the pet toy. The material comprising the body is advantageously an elastomer including, for example, natural or synthetic rubber, or a suitable plastic having elastomeric properties.

The envelope is advantageously, but not necessarily, of a generally spherical configuration, and of like size as that of a tennis ball, so as to permit functional accommodation of the toy in currently available tennis ball launchers for pet fetch play adapted to holding tennis balls.

Each of the ribs includes a wedge portion facing inward generally towards the central toy axis and tapering to an apex, such that the apex of each wedge portion is the most radially inward part of a corresponding rib at a given axial position. The apex of each of the wedge portions is advantageously, although not necessarily, spaced apart a constant distance (constant spacing) from the central toy axis substantially over an axial extent of the wedge portions such that a support channel of generally cylindrical configuration is defined by the locus of the wedge apices. Satisfying the requirements of this optional feature (i.e., defined by the term "constant spacing"), however, does not mean that the distance cannot locally vary and, for example, a wavy or ridged edge may be provided to the wedge apex in the axial direction thereof. A treat having an outer dimension roughly the same as the corresponding diameter support channel will be supportably held within the toy when inserted therein via, for example, the spaces between the ribs, as being supported in the support channel by the inwardly facing wedge portions. Since freeing the treat will present a challenge to a pet, the toy is thought to provide mental stimulation to the pet in its quest to access the treat, and reward upon successfully dislodging the treat, or portions thereof, from the support channel.

The wedges are advantageously textured on side faces thereof, conveniently provided, for example, in the form of ridges, such that, as the pet uses its teeth to attempt to access the captively held treat or treats, the toy provides a cleaning effect to the teeth and stimulation of the gums.

Optionally, an outer surface texture can also, or alternatively, be provided to the toy, so as to provide a better grip and also to enhance a proper fit when held in a tennis ball launcher (or other sized launching device), by reducing a degree of tolerance criticality relating to ball diameter in the manufacturing process. Such outer texture is conveniently provided, for example, in the form of variably sized raised bumps. Also, if desired, an access port or ports can be optionally provided through one or both of the poles, to provide, inter alia, additional access to the support channel from an exterior of the toy.

Another embodiment, which is also provided, by example, in the form of a toy having a generally spherically shaped outer envelope, but which of course could alternatively take virtually any three-dimensional shape, includes a body having a central toy axis which extends between opposed poles of the body. The body, as in the previously described embodiment, includes at least three circumferentially spaced-apart ribs which extend between the poles to define an outer envelope of the pet toy.

Like the previous embodiment, each of the ribs includes a tapered portion facing inward generally towards the central toy axis. However, instead of comprising a simple wedge having an apex, located at the most radially inward part of each rib at a given axial position, and which is defined by an intersection of planes forming the two sides of each wedge portion, the wedge-shaped profile is modified, instead, to have a truncated apex including an advantageously arcuate channel formed axially through the otherwise sharply formed apex.

Such structure permits a treat to be secured inside the toy, and to be held there reliably, irrespective of a range of size variation of a type of treat used. In particular, two distinct diameter loci are defined respectively by the lateral edges adjacent to each of the channels formed in the inwardly facing portions of the ribs (smaller diameter) and by the recessed central regions of the inwardly facing portions within the channels (larger diameter). An example of the manner of formation of these channels will be described below herein.

An additional embodiment functions analogously to the previously described embodiments, but serves to illustrate the breadth of the invention, and the wide variation of physical forms in which the invention is suitably practiced.

A particularly advantageous form of the additional embodiment, which is provided, by example, in the form of a toy having a generally cubic outer envelope, permits reception of treats in four discrete treat support channels, rather than only one treat support channel, as in the prior-described embodiments.

A method of the formation of these multiple support channels according to the additional embodiment is also disclosed herein.

The above, and other objects, features and advantages of the present invention will become apparent from the following description read in conjunction with the accompanying drawings.

DETAILED DESCRIPTION OF THE PREFERRED EMBODIMENT

Figure 1:
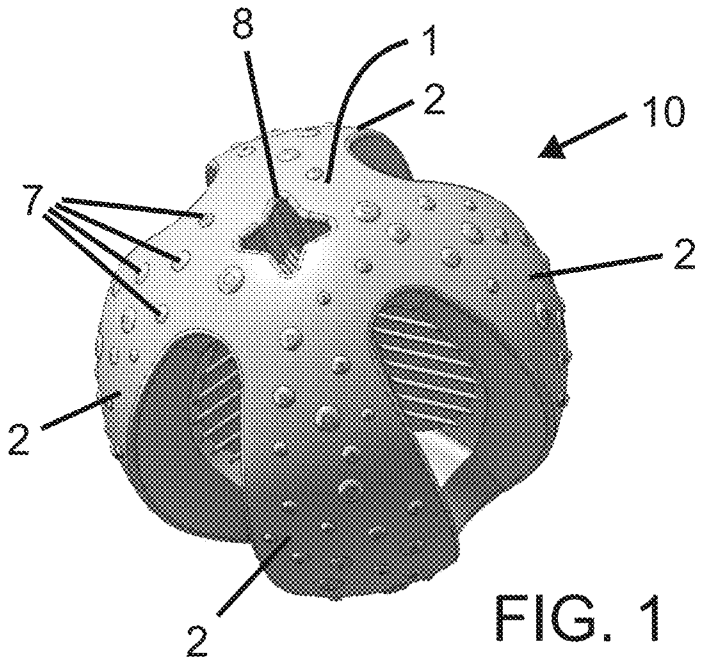
FIG. 1 is perspective view of an embodiment of a pet toy according to the invention.
Figure 2:
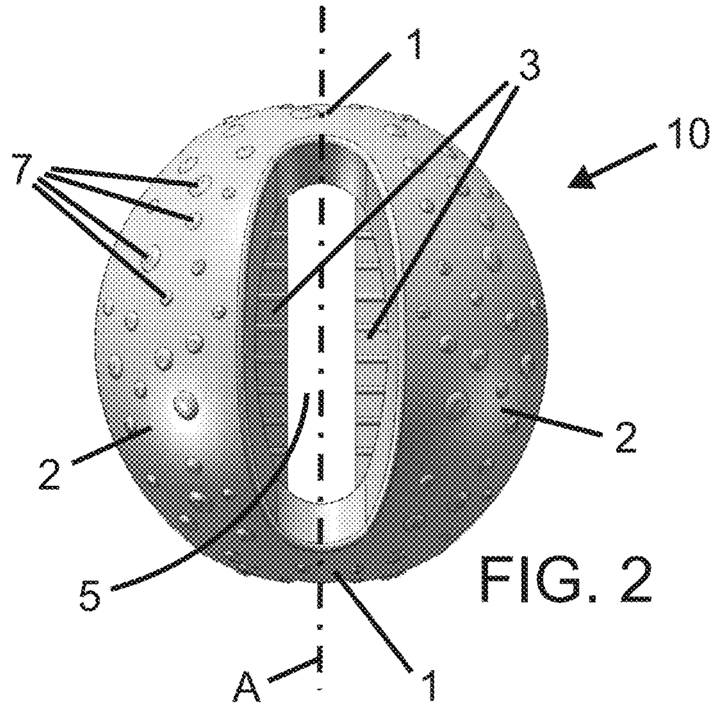
FIG. 2 is a side elevation of the pet toy of FIG. 1.
Figure 3:
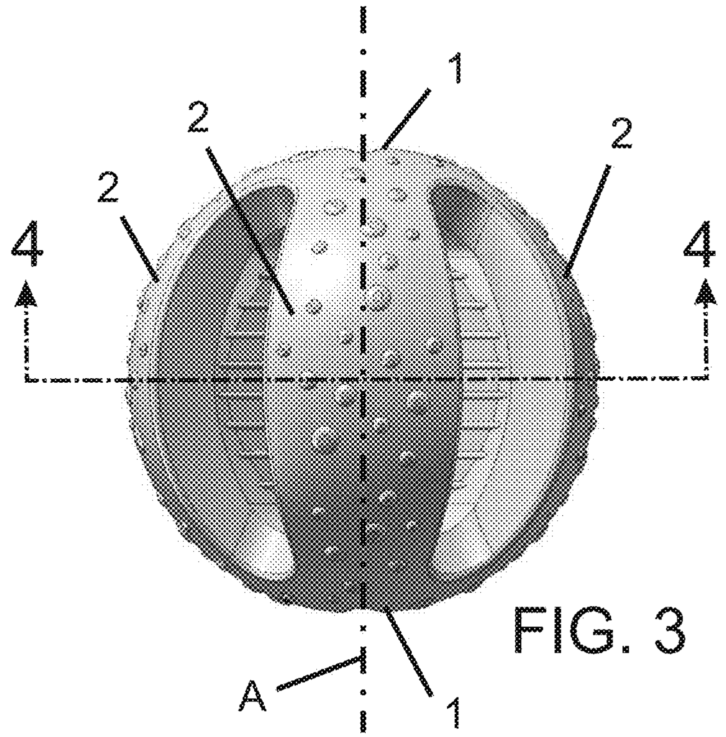
FIG. 3 is a side elevation rotated 45° from the view of FIG. 2.

Referring now to the figures, an embodiment of a toy according to the invention is depicted generally at 10. The toy 10 includes a central toy axis A which extends between opposed poles 1, and at least three ribs 2 (four ribs 2 in the depicted example) which extend between the poles 1 and which define an outer envelope of toy 10 which, in the depicted example, is generally spherical. It is noted that there is no requirement that a toy according to an embodiment of the invention be spherical, or that indeed such toy need take a symmetric shape about the toy axis.

Each of the ribs 2 includes a wedge portion 3 facing inward generally towards the central toy axis and which tapers to an apex 3*a*, such that the apex 3*a* of each of the wedge portions 3 is the most radially inward part of each rib 2. The term "wedge" is defined herein as any structural configuration which tapers from a relatively wide end to a relatively narrow edge. The terms "apex" (or "apices" when referring in the plural sense) is defined herein as the relatively narrow edge to which the wedge tapers.

Figure 4:
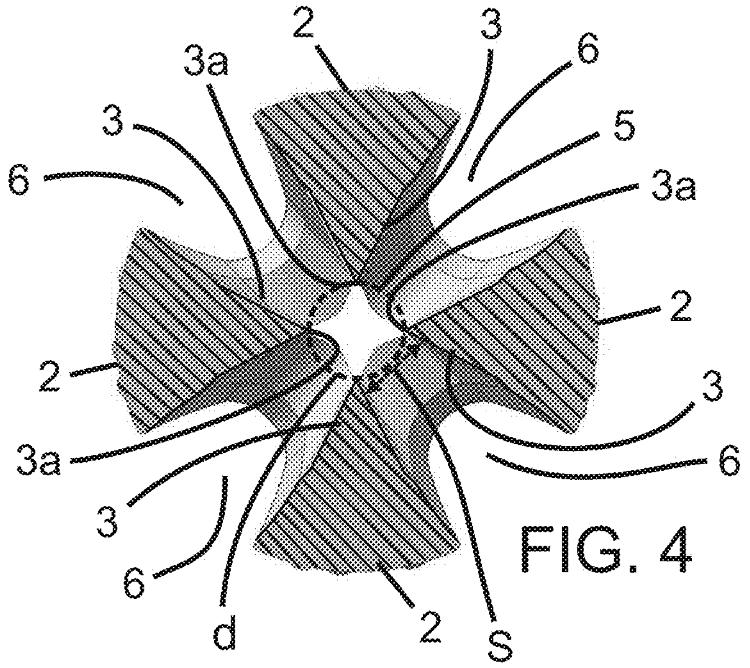
FIG. 4 is a cross-sectional view taken along line 4-4 in FIG. 3.
Figure 5:
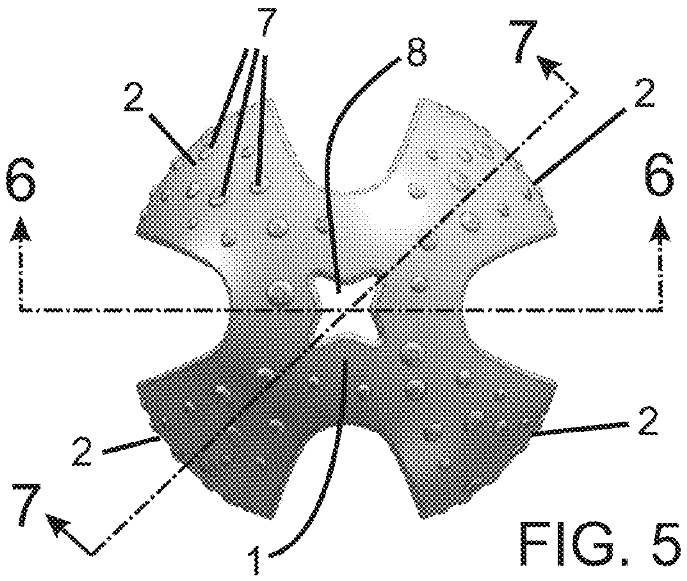
FIG. 5 is a plan view of the pet toy of FIG. 1.
Figure 7:
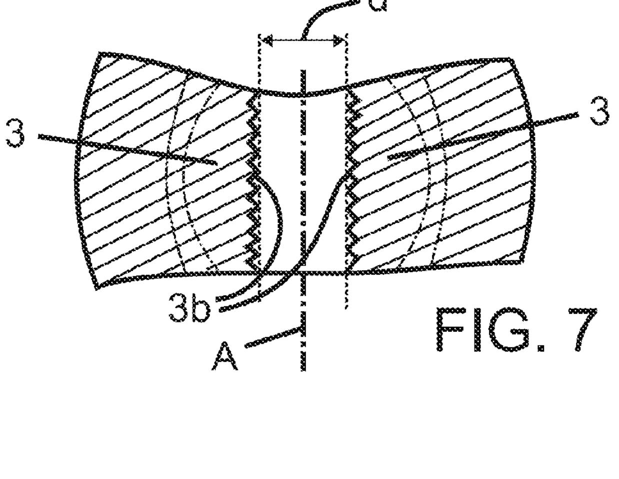
FIG. 7 is a partial cross-sectional view taken along line 7-7 in FIG. 5 showing modified apices of wedge portions having constant spacing with a locally wavy configuration.

The apex 3*a* of each of the wedge portions 3 is spaced apart from the central toy axis A such that a support channel 5 is defined by the locus of the wedge apices 3*a*. The shape of the support channel will be determined by the particular spacing of the apices 3*a* from the central toy axis A at various axial positions therealong. In an advantageous embodiment, as shown in the depicted example, the apices are each spaced apart a constant distance from the central toy axis A or from an opposing apex 3*a* of another of the wedge portions 3 substantially over an axial extent of the wedge portions 3, such that a support channel 5 of generally cylindrical configuration is defined by the locus of the wedge apices 3*a* (as shown by the central dotted circle in FIG. 4, defining a diameter d of the support channel 5). This advantageous feature, even when provided, however, does not mean that the distance cannot locally vary. For example, as shown in FIG. 7, a wavy edge 3*b* may be provided to the wedge apex 3*a*, while maintaining a substantially constant overall separation distance equivalent to diameter d over the axial extent, as depicted.

Optionally, an outer surface texture can also, or alternatively, be provided to the toy, so as to provide a better grip and also to enhance a proper fit when held in a ball launcher, by reducing a degree of tolerance criticality relating to ball diameter in the manufacturing process. Such outer texture is conveniently provided, for example, in the form of variably sized bumps 7. Also, if desired, an access port or ports 8 can be optionally provided through one or both of the poles 1, to provide additional access to the support channel 5 from an exterior of the toy 10.

Figure 6:
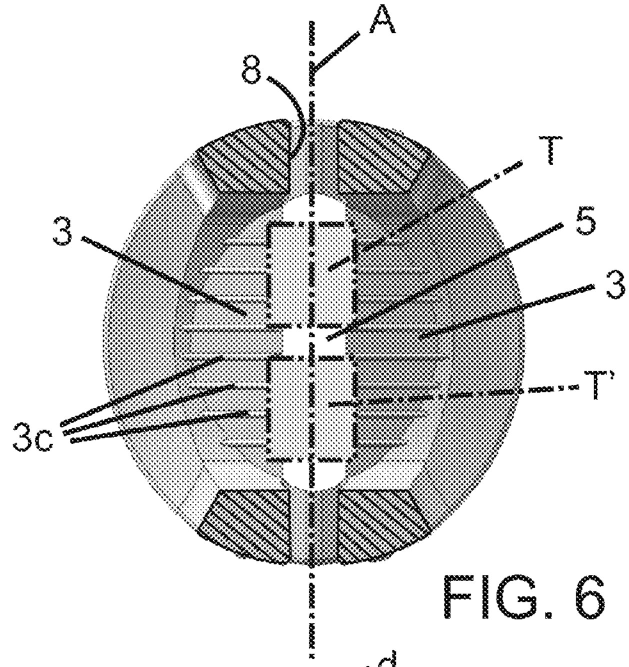
FIG. 6 is a cross-sectional view taken along line 6-6 in FIG. 5.

Treats T, T', as shown, for example, in phantom in FIG. 6, having an outer dimension roughly the same as the support channel 5 will be supportably held within the toy 10 when inserted therein via, for example, the spaces 6 between the ribs 2, and then squeezed further between other spaces S between the wedge portions 3 which are narrower than a diameter d of the support channel 5, so as to cause the treats T, T' to "pop" into the support channel 5 and be supportably held (locked) within the support channel 5 by the inwardly facing wedge portions 3. It will be noted that while treats closely matching the diameter d of the support channel 5 are advantageously selected such that a secure supported accommodation is achieved, smaller treats will also be held inside the toy 10, as long as the size of the treats are larger than the other spaces S (see FIG. 4) between the wedge portions 3, which are naturally narrower than the diameter d of the support channel 5. Conversely, elastic deformation of the wedge apices 3*a* would also allow some leeway for accommodation of a larger treat. Since freeing the treat or treats T, T' from the toy 10 will present a challenge to a pet by virtue of the fact that the other spaces S between sides of adjacent ones of the wedge portions 3 (see FIG. 4) are narrower than the diameter d of support channel 5, the toy 10 is thought to provide mental stimulation and reward upon successfully dislodging the treat or portions thereof from the support channel 5.

The surfaces of the wedge portions 3 can optionally be textured, for example, in the form of raised ridges 3*c* (FIG. 6), such that the teeth of a pet attempting to dislodge the treats T, T' will be cleaned and the pet's gums, massaged. Ridges 3*c* (or other suitable texturing) will also advantageously enhance retention of peanut butter or other similar food substance found attractive to a pet smeared in the wedge portions 3, for even greater sensory appeal.

The toy 10 disclosed herein can advantageously be manufactured according to the approach set forth in the disclosure of U.S. Pat. Pub. 2005/0181175 A1 (Wechsler, application Ser. No. 10/963,443 filed Oct. 12, 2004) published Aug. 18, 2005 and entitled INTEGRAL FRAME STRUCTURES AND MANUFACTURING METHOD, the entirely of which is herein incorporated by reference.

It is noted that the method described in the above-mentioned U.S. patent publication which, for producing the depicted example, would involve the use of a four-part mold to produce the at least partially hollow structure having four ribs extending from pole to pole, each having a wedge shaped profile facing radially inward, can be used for production, not only in connection with vulcanization molding of natural rubber, but also in association with injection molding processes. As a result, the toy according to embodiment of the invention can, if desired, be molded of an engineered thermoplastic material which can be formulated (engineered) to potentially be much more durable and resilient than natural rubber, thus allowing the synergistic combination of a chew toy having enhanced durability, with the treat release benefits of a treat dispensing toy which heretofore was generally restricted to natural rubber compositions. Of course, this option notwithstanding, it is contemplated that the toy according to the invention can nevertheless be made of natural rubber without departure from the invention.

Figure 8:
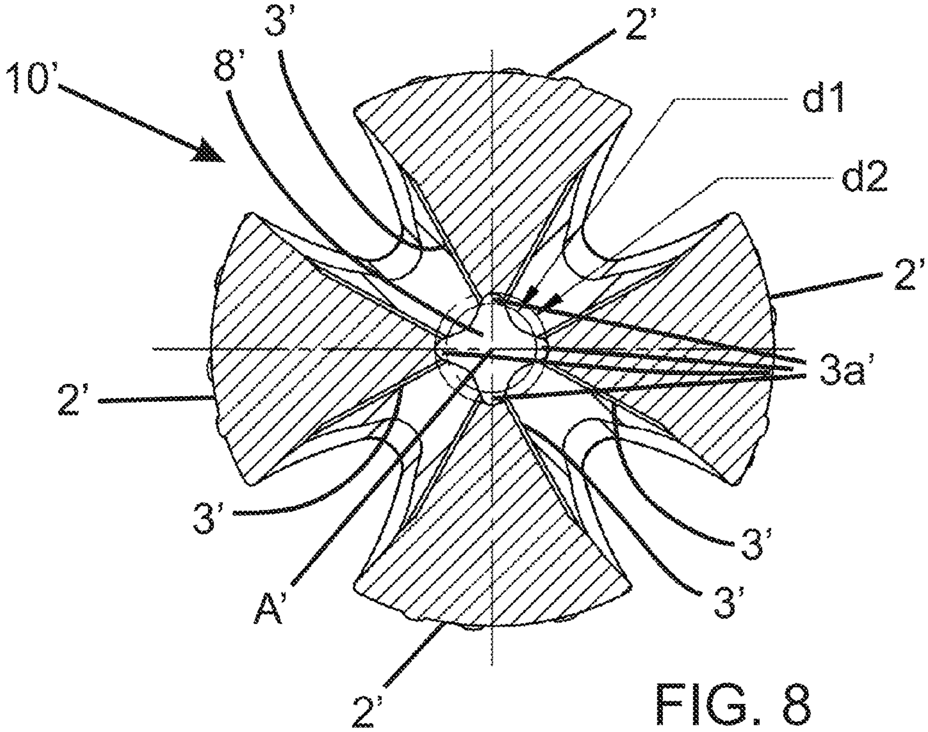
FIG. 8 is a cross-sectional view of an alternative embodiment of a pet toy having modified apex portions.

Turning now to FIG. 8, another embodiment, which is also provided, by example, in the form of a toy having a generally spherically shaped outer envelope, but which of course could alternatively take virtually any three-dimensional shape, is shown generally at 10'. Toy 10' includes a body having a central toy axis which extends between opposed poles of the body. The body, as in the previously described embodiment, includes at least three circumferentially spaced-apart ribs (four ribs 2' in the example depicted) which extend between the poles to define an outer envelope of the pet toy.

Figure 9A:
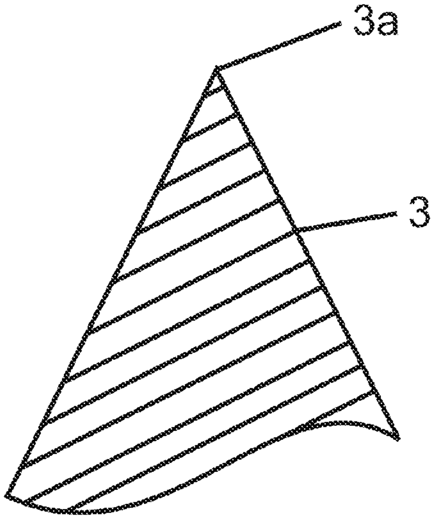
FIG. 9*a* is a cross-sectional detail view of a standard apex portion according the embodiment of FIGS. 1-6.
Figure 9B:
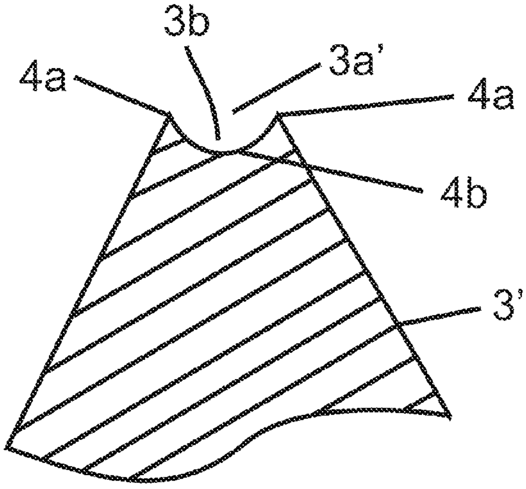
FIG. 9*b* is a cross-sectional detail view of a truncated apex portion according the alternative embodiment of FIG. 8.
Figure 10:
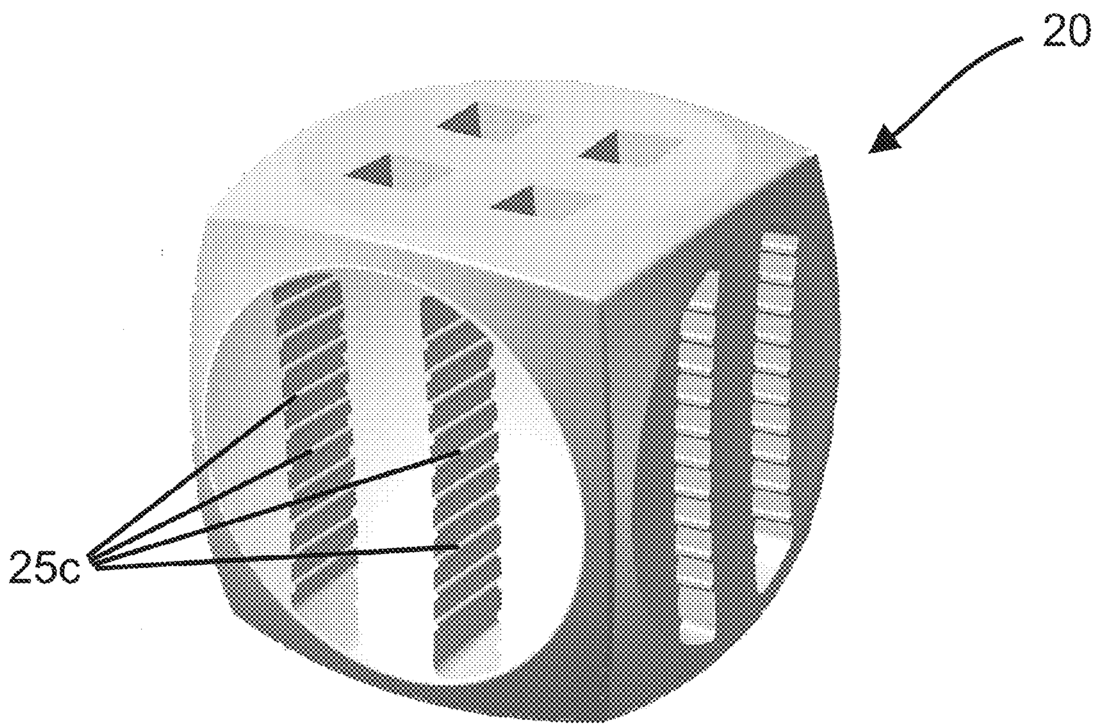
FIG. 10 is perspective view of another embodiment of a pet toy according to the invention.
Figure 11:
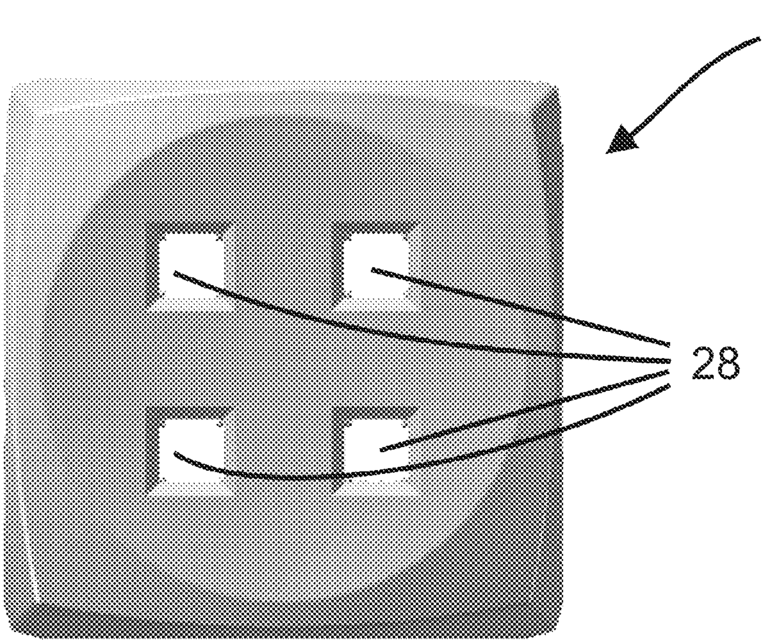
FIG. 11 is a top plan view of the pet toy embodiment of FIG. 10.
Figure 12:
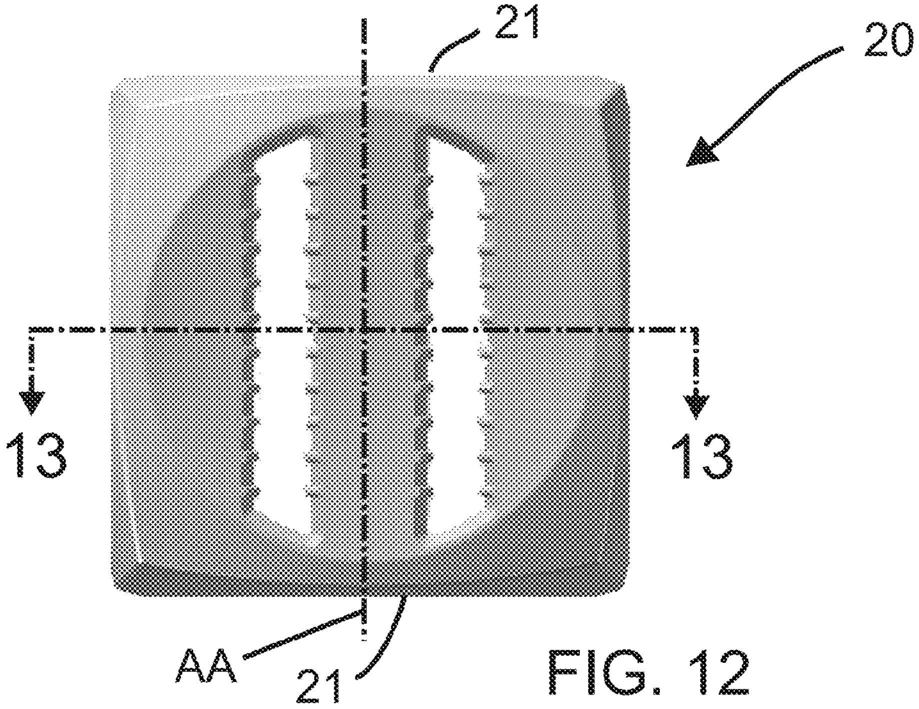
FIG. 12 is a side elevation of the pet toy embodiment of FIGS. 10 and 11.
Figure 13:
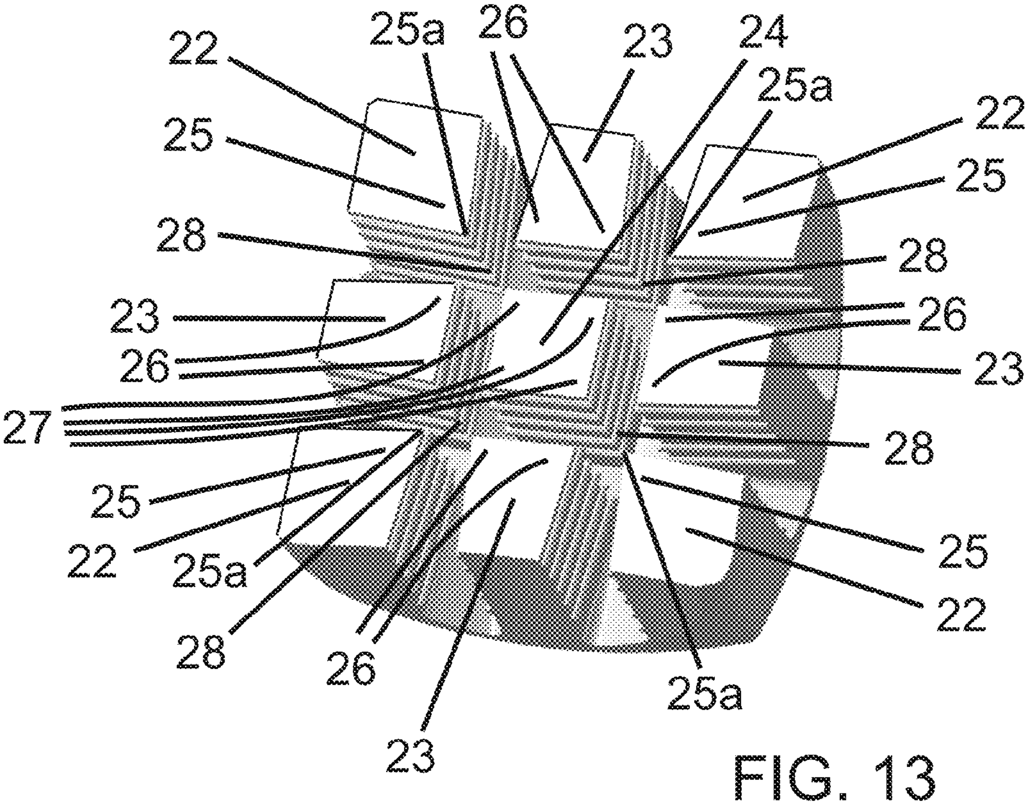
FIG. 13 is a perspective cross-sectional view taken along line 13-13 in FIG. 12.

Toy 10' is the same in all respects to the embodiment of FIGS. 1-6 except as indicated below. Like the previous embodiment, each of the ribs 2' includes a tapered wedge portion 3' facing inward generally towards the central toy axis A'. However, instead of comprising a simple wedge 3 having an apex (located at the most radially inward part of each rib 2 at a given axial position) which is defined by an intersection of planes forming the two sides of each wedge portion 3, the wedge-shaped profile is modified, instead, to form a wedge portion 3' having a truncated apex 3*a*' including an advantageously arcuate channel 3*b* formed through the otherwise sharply formed apex 3*a*. A comparison between the simple wedge portion 3 and the modified wedge portion 3' is depicted in FIGS. 9*a* and 9*b*.

Such modified structure permits a treat to be secured inside the toy 10', and to be held there reliably, irrespective of a certain degree of size variation over a limited range based upon a particular type or brand of treat used. In particular, two distinct diameter loci d1 and d2, as seen in FIG. 8, are defined respectively by the lateral edges 4*a* formed adjacent to each of the channels 3*b* formed in the inwardly facing portions of the ribs (smaller diameter d1) and by the central region 4*b* of each of the inwardly facing truncated apices 3*a*' of the wedge portions 3' within the channels 3*b* (larger diameter d2).

To avoid undercuts which would prevent advantageous molding of toy 10' with injection molding technology, the formation of the channels 3*b* can optionally and advantageously be formed by a rod or rods (not shown) having a cross-sectional shape matching that of an access port or ports 8' (in the shape of a four-pointed star, as shown) provided through one or both of the poles of the toy 10'. The rod (or rods) is (are) inserted during molding through the top and/or bottom poles to produce the port or ports 8' and the channels 3*b* of the truncated apices 3*a'*.

It is noted that, while the above examples described for illustrative purposes are generally spherical and of tennis ball size, and as defined collectively by four ribs, many other shapes defined by three or more ribs are feasible, so long as the wedge portions are configured to allow a treat or other object to be lockably retained centrally of the toy when inserted therein. Some of the contemplated shapes, which are by no means exhaustive of the possibilities, include, for example, an elongated shape extending along the toy axis (pole to pole), a generally rectilinear shape, a star shape, etc. Other embodiments of a toy according to the invention are contemplated which would take the form of non-symmetrical shapes resembling familiar items, such as, for example, fruits and vegetables, animals, etc.

Referring now to FIGS. 10-13, another embodiment of a toy according to the invention is depicted generally at 20. The toy 20 includes a central toy axis AA (see FIG. 12) which extends between opposed poles 21, and nine ribs which extend longitudinally between the poles 21 (see FIG. 13). The nine ribs are comprised of four corner ribs 22, four lateral peripheral ribs 23 and one central rib 24. Poles 21 and corner and lateral peripheral ribs 22, 23 collectively define an outer envelope of toy 20 which, in the depicted example, is generally cubic.

Each of the corner ribs 22 includes a wedge portion 25 facing inward generally towards the central toy axis, such that the apices 25*a* of the wedge portions 25 are the most radially inward part of each corner rib 22. Lateral peripheral ribs 23 include two wedge portions 26. The central rib 24 has four wedge portions 27. Wedge portions 25, 26, 27 face each other in a manner defining four discrete treat support channels 28 in which at least one treat (not shown) is receivable so as to be held between facing ones of the wedge portions 25, 26, 27, in a manner analogous with that explained in the prior described embodiments.

The surfaces of the wedge portions 25, 26, 27 can optionally be textured, for example, in the form of raised ridges 25*c* (FIG. 1), such that the teeth of a pet attempting to dislodge treat(s) held in the treat support channels 28 will be cleaned and the dog's gums, massaged.

A manner of molding the toy 20 disclosed herein can advantageously be achieved according to the approach set forth in the disclosure of U.S. Pat. Pub. 2005/0181175 A1 (Wechsler, application Ser. No. 10/963,443 filed Oct. 12, 2004) published Aug. 18, 2005 and entitled INTEGRAL FRAME STRUCTURES AND MANUFACTURING METHOD, the entirely of which is herein incorporated by reference, and as modified herein in order to suitably permit molding of the central rib 24.

Figure 14:
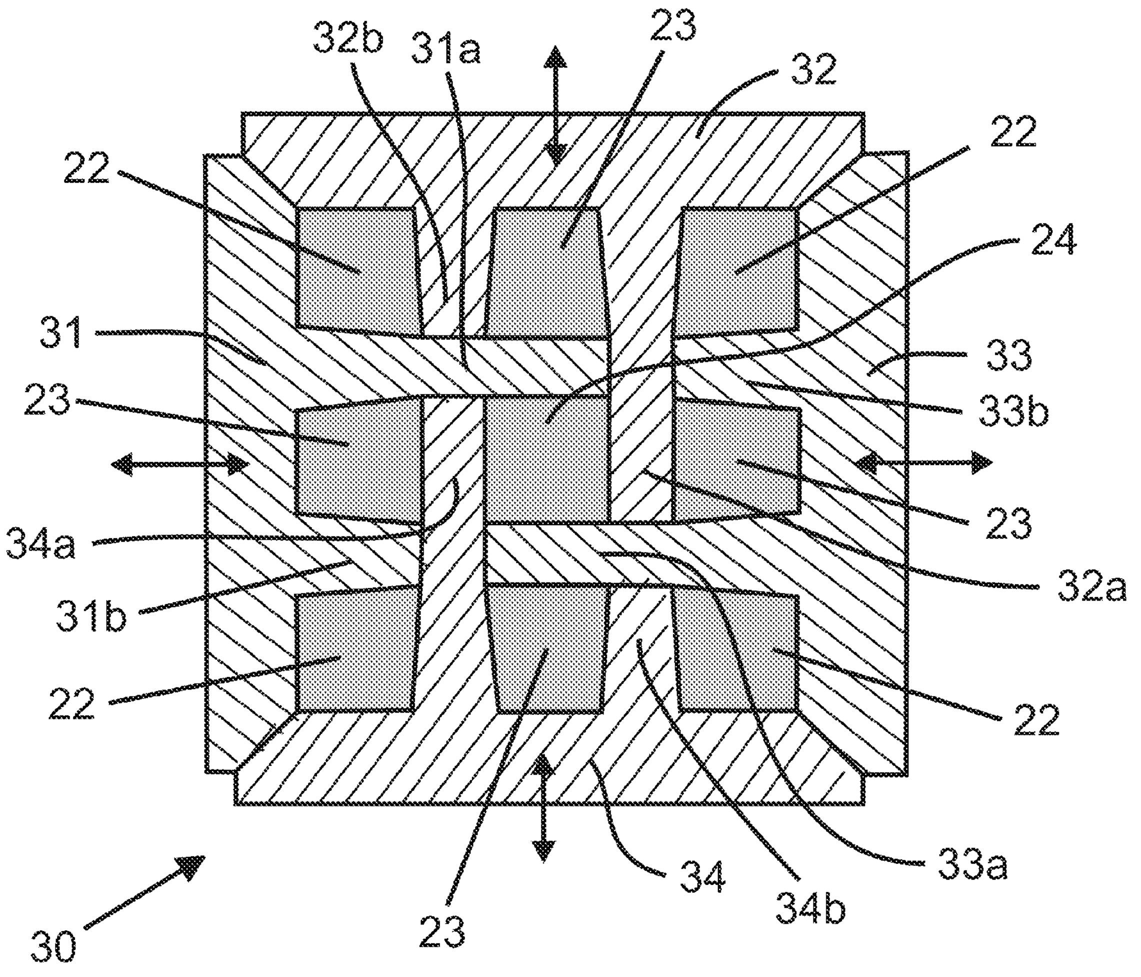
FIG. 14 is an explanatory cross-sectional view illustrating a manner of molding the pet toy embodiment of FIGS. 10-13.

Turning now to FIG. 14, an explanatory cross-sectional view taken cross-wise to the longitudinal extent of the ribs 22, 23, 24 running between the opposed poles 21 will serve to illustrate the molding features according to an example of the invention. A four part mold 30 (the parts of which are shown with diagonal cross-hatching) includes a first mold part 31, a second mold part 32, a third mold part 33 and a fourth mold part 34 advanceable and retractable in the general direction of the double arrows. Each of the first mold part 31, second mold part 32, third mold part 33 and fourth mold part 34 respectively includes a relatively longer mold portion 31*a*, 32*a*, 33*a*, 34*a*, and a relatively shorter mold portion 31*b*, 32*b*, 33*b*, 34*b*. The longer mold portions 31*a*, 32*a*, 33*a*, 34*a* and the shorter mold portions 31*b*, 32*b*, 33*b*, 34*b* form an interlocking spiral when the mold parts 32, 33, 34, 35 are brought together, as shown, enabling central rib 24 to be formed without formation of undercuts which would otherwise impede opening of the mold parts 31, 32, 33, 34 after molding and release of the molded toy 20.

It is noted that, while useful as a treat holder/dispenser, as described above, a toy according to the invention could also allow retention of an article/object of appropriate size and having an aroma which would allow the dog to locate the toy by sense of smell, facilitating retrieval of the toy even at night or when the toy is hidden in vegetation or rolls under a bush when thrown.

It is further noted that while all of the depicted examples include a treat support channel which runs continuously in the axial direction, it is contemplated within the scope of the invention that axially spaced partitions can be provided within the support channel to subdivide the support channel in the axial direction into multiple support channels. Further, two or more toys can be combined axially end to end as a single integrally molded toy having multiple loading chambers, i.e., support channels.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A toy, comprising:

an elastomeric body including a central toy axis which passes through opposite poles, said body further including at least three ribs which extend between the opposite poles, said at least three ribs presenting wedges terminating at respective apices, said wedges extending codirectionally with said central toy axis and being present over at least an interior axial extent of said elastomeric body which is spaced apart from said opposite poles such that a locus of said apices collectively define an interior channel bounded by said at least three ribs, the apices of the wedges facing inwardly of the interior channel such that said wedges function as retaining structure which engage a treat or a scent releasing article introduced into said interior channel.

2. A toy according to claim 1, wherein, for at least a portion of said at least three ribs, a spacing distance between said apices and the central toy axis remains substantially constant over at least a portion of said interior axial extent.

3. A toy, comprising:

an elastomeric body including at least three rib portions being spaced apart from one another and running codirectionally with an axial direction extending between first and second opposed ends, said at least three rib portions presenting wedges arranged in said axial direction and terminating at respective apices, said wedges extending over at least an interior portion of said elastomeric body which is spaced apart from said first and second opposed ends such that a locus of said apices of an adjacent group of at least three of said at least three rib portions collectively define an interior channel, the apices of the wedges serving as retaining structure for a treat or a scent releasing article introduced into said interior channel.

4. A toy according to claim 3, wherein said rib portions include four adjacent groups of ribs, the locus of the wedges of an aggregate of said groups which collectively defining four discrete interior channels.

5. A toy, comprising:

an elastomeric body including spaced apart ribs extending lengthwise between opposed ends and which define loading slots through which a treat or scent releasing article can be introduced into the toy, said ribs presenting wedges terminating at respective apices, said wedges being present over at least an interior lengthwise extent of said elastomeric body which is spaced apart from said opposed ends such that a locus of said apices of an adjacent group of ribs collectively defines an interior channel having a cross-section which is larger than a locally corresponding spacing of the loading slots, such that when the treat or scent releasing article having a size larger than the spacing of the loading slots is introduced into the toy via the loading slots by applied deformation of the ribs to spread the loading slots, the treat or scent releasing article is lockingly held in the interior channel upon release of the applied deformation which returns the loading slots to the spacing smaller than the size of the treat or scent releasing article.

6. A toy according to claim 5, wherein said ribs include nine ribs, an outer eight ribs of said nine ribs defining eight loading slots, and an inner rib of said nine ribs defining four interior channels in combination with said wedges of said outer eight ribs.

7. A toy according to claim 5, wherein an outer envelope of said elastomeric body has a generally cubic configuration.

8. A toy according to claim 1, wherein:

said elastomeric body approximates a spherical envelope; and said spherical envelope is a generally like size to that of a standard tennis ball.

9. A toy according to claim 1, wherein a diameter of said interior channel does not significantly vary over at least a portion of said interior axial extent.

10. A toy according to claim 2, wherein said at least a portion of said at least three ribs which have a spacing distance between said apices and the central toy axis which remains substantially constant, said wedges have wavy or ridged edges.

11. A toy according to claim 1, wherein at least a portion of said wedges includes a textured surface.

12. A toy according to claim 3, wherein:

said elastomeric body approximates a spherical envelope; and said spherical envelope is a generally like size to that of a standard tennis ball.

13. A toy according to claim 12, wherein said at least three rib portions include four rib portions approximately equally spaced circumferentially.

14. A toy according to claim 3, wherein a diameter of said interior channel does not significantly vary over at least a portion of said interior portion.

15. A toy according to claim 1, wherein at least a portion of said wedges includes a textured surface.

16. A toy according to claim 5, wherein, for at least one said interior channel, a diameter of said at least one interior channel does not significantly vary over at least a portion of said interior lengthwise extent.

17. A toy according to claim 5, wherein:

said elastomeric body approximates a spherical envelope; and said ribs include four rib portions approximately equally spaced circumferentially.

* * * * *